US008060366B1

(12) United States Patent
Maganti et al.

(10) Patent No.: US 8,060,366 B1
(45) Date of Patent: Nov. 15, 2011

(54) SYSTEM, METHOD, AND COMPUTER-READABLE MEDIUM FOR VERBAL CONTROL OF A CONFERENCE CALL

(75) Inventors: Srinivas Maganti, Andhra Pradesh (IN); Myron P. Sojka, Logan, IA (US)

(73) Assignee: West Corporation, Omaha, NE (US)

( * ) Notice: Subject to any disclaimer, the term of this patent is extended or adjusted under 35 U.S.C. 154(b) by 866 days.

(21) Appl. No.: 11/778,884

(22) Filed: Jul. 17, 2007

(51) Int. Cl.
   *G10L 17/00* (2006.01)
   *G10L 15/22* (2006.01)
   *H04L 12/18* (2006.01)

(52) U.S. Cl. ........ 704/246; 704/251; 704/275; 370/260; 379/88.02; 379/158

(58) Field of Classification Search ................... 704/251, 704/270, 270.1, 275, 246; 379/88.01, 88.02, 379/93.02, 158; 370/260, 261
   See application file for complete search history.

(56) References Cited

U.S. PATENT DOCUMENTS

| | | | |
|---|---|---|---|
| 5,373,555 A | 12/1994 | Norris et al. | |
| 5,784,546 A | 7/1998 | Benman, Jr. | |
| 5,812,659 A | 9/1998 | Mauney et al. | |
| 5,822,727 A | 10/1998 | Garberg et al. | |
| 5,892,813 A | 4/1999 | Morin et al. | |
| 5,903,870 A | 5/1999 | Kaufman | |
| 5,916,302 A * | 6/1999 | Dunn et al. .................... 709/204 |
| 5,999,207 A | 12/1999 | Rodriguez et al. | |
| 6,073,101 A * | 6/2000 | Maes ............................ 704/275 |
| 6,273,858 B1 | 8/2001 | Fox et al. | |
| 6,347,301 B1 | 2/2002 | Bearden, III et al. | |
| 6,359,612 B1 | 3/2002 | Peter et al. | |
| 6,374,102 B1 | 4/2002 | Brachman et al. | |
| 6,535,730 B1 | 3/2003 | Chow et al. | |
| 6,587,683 B1 | 7/2003 | Chow et al. | |
| 6,591,115 B1 | 7/2003 | Chow et al. | |
| 6,606,493 B1 | 8/2003 | Chow et al. | |
| 6,654,447 B1 * | 11/2003 | Dewan ............................ 379/76 |
| 6,816,468 B1 * | 11/2004 | Cruickshank .................. 370/260 |
| 6,819,945 B1 | 11/2004 | Chow et al. | |
| 6,853,716 B1 * | 2/2005 | Shaffer et al. ............. 379/202.01 |
| 7,085,717 B2 * | 8/2006 | Kepuska et al. ............... 704/241 |
| 7,133,512 B2 * | 11/2006 | Creamer et al. ......... 379/202.01 |
| 7,136,684 B2 * | 11/2006 | Matsuura et al. ........... 455/575.2 |
| 7,187,762 B2 * | 3/2007 | Celi et al. ................. 379/202.01 |
| 7,286,990 B1 * | 10/2007 | Edmonds et al. .............. 704/275 |
| 7,474,634 B1 * | 1/2009 | Webster et al. ................ 370/261 |
| 7,583,657 B1 * | 9/2009 | Webster et al. ................ 370/352 |
| 7,593,520 B1 * | 9/2009 | Croak et al. .............. 379/202.01 |
| 7,617,280 B1 * | 11/2009 | Webster et al. ................ 709/204 |
| 7,703,104 B1 * | 4/2010 | Webster et al. ................ 719/310 |
| 7,792,263 B2 * | 9/2010 | D'Amora et al. ......... 379/202.01 |
| 7,933,226 B2 * | 4/2011 | Woodruff et al. ............. 370/260 |
| 7,949,118 B1 * | 5/2011 | Edamadaka et al. .......... 370/260 |
| 2001/0054071 A1 | 12/2001 | Loeb | |
| 2003/0130016 A1 * | 7/2003 | Matsuura et al. .............. 455/569 |

(Continued)

*Primary Examiner* — Martin Lerner

(57) ABSTRACT

A system, method, and computer readable medium that facilitate verbal control of conference call features are provided. Automatic speech recognition functionality is deployed in a conferencing platform. Hot words are configured in the conference platform that may be identified in speech supplied to a conference call. Upon recognition of a hot word, a corresponding feature may be invoked. A speaker may be identified using speaker identification technologies. Identification of the speaker may be utilized to fulfill the speaker's request in response to recognition of a hot word and the speaker. Particular participants may be provided with conference control privileges that are not provided to other participants. Upon recognition of a hot word, the speaker may be identified to determine if the speaker is authorized to invoke the conference feature associated with the hot word.

17 Claims, 5 Drawing Sheets

U.S. PATENT DOCUMENTS

| | | | |
|---|---|---|---|
| 2003/0231746 A1* | 12/2003 | Hunter et al. | 379/88.01 |
| 2004/0105395 A1* | 6/2004 | Friedrich et al. | 370/261 |
| 2004/0218553 A1* | 11/2004 | Friedrich et al. | 370/260 |
| 2005/0170863 A1 | 8/2005 | Shostak | |
| 2006/0069570 A1 | 3/2006 | Allison et al. | |
| 2006/0165018 A1* | 7/2006 | Gierach et al. | 370/261 |
| 2007/0121530 A1* | 5/2007 | Vadlakonda et al. | 370/260 |
| 2007/0133437 A1* | 6/2007 | Wengrovitz et al. | 370/260 |
| 2008/0133245 A1* | 6/2008 | Proulx et al. | 704/277 |
| 2008/0232556 A1* | 9/2008 | Gilbert et al. | 379/88.01 |

* cited by examiner

SYSTEM, METHOD, AND COMPUTER-READABLE MEDIUM FOR VERBAL CONTROL OF A CONFERENCE CALL

FIELD OF THE INVENTION

The present invention is generally related to call conferencing technologies and, more particularly, to mechanisms for providing verbal control of conference call features.

BACKGROUND OF THE INVENTION

A conference call is a telephone call in which more than two parties participate in the call. The conference call may be designed to allow a called party to participate during the call, or the call may be set up so that a called party may only listen into the call and is unable to contribute audio to the call. When a plurality of participants are allowed to participate in the call, the conference platform receives a plurality of audio streams from the conference participants, mixes these streams, and transmits the mixed audio streams back to the participants.

Conference calls may be designed so that the calling party, or conference originator, calls other participants and adds them to the call. In other systems, participants are to able call into the conference call themselves, e.g., by dialing into a conference bridge, by using a special telephone number set up for that purpose, or by other mechanisms.

Most companies use a specialized service provider for conference calls. These service providers maintain the conference bridge, and provide the phone numbers used to access the meeting or conference call.

Various conference call features may be activated by one or more conference participants during a conference call. For example, a mute feature may be activated to prohibit transmission of audio into the conference call by the muted participant. A lock control may be activated to prohibit additional participants from joining the conference call. A roll call control may be activated that transmits an audible roll call of the participants included in the conference call.

Contemporary conferencing platforms rely on manual user input, e.g., by dual-tone multi-frequency (DTMF) or keyed input supplied at a conferencing station, to invoke conferencing features or controls. Thus, a user at a rotary phone may not have any mechanism for activating a conference feature. Moreover, contemporary keyed input mechanisms are often cumbersome for participants to supply.

Therefore, what is needed is a mechanism that overcomes the described problems and limitations.

SUMMARY OF THE INVENTION

The present invention provides a system, method, and computer readable medium for providing verbal control of conference call features. Automatic speech recognition functionality is deployed in a conferencing platform. "Hot" or control words are configured in the conference platform that may be identified in speech supplied to the conference call. Upon recognition of a hot word, a corresponding feature may be invoked. Advantageously, a mixed stream, e.g., output by a conference bridge or other entity, may be analyzed for recognition of hot words. Thus, a single stream may be analyzed for invoking conference features invoked by any conference participant. In another embodiment, a speaker may be identified using speaker identification technologies. Identification of the speaker may be utilized to fulfill the speaker's request in response to recognition of a hot word and the speaker.

In one embodiment of the disclosure, a method for providing verbal control of a conference call is provided. The method comprises bridging a plurality of conference call legs to form a bridged conference stream, evaluating the bridged conference stream with a speech recognition algorithm, determining if a first hot word is identified in the bridged conference stream, and responsive to determining the first hot word is in the bridged conference stream, invoking a conference feature associated with the first hot word.

In another embodiment of the disclosure, a computer-readable medium having computer-executable instructions for execution by a processing system, the computer-executable instructions for providing verbal control of a conference call is provided. The computer-readable medium comprises instructions for bridging a plurality of conference call legs to form a bridged conference stream, evaluating the bridged conference stream with a speech recognition algorithm, determining if a hot word is identified in the bridged conference stream, and responsive to determining the hot word is in the bridged conference stream, identifying a speaker of the hot word.

In a further embodiment of the disclosure, a system for providing verbal control of a conference call is provided. The system comprises a database that specifies privileges of respective conference participants, a media server adapted to terminate a conference leg with each of a plurality of terminal devices of the participants, bridge a plurality of conference legs to form a bridged conference stream, evaluate the bridged conference stream with a speech recognition algorithm, determine if a hot word is included in the bridged conference stream, and identify a speaker of the hot word, wherein the hot word is associated with a conference feature. The system further includes an application server communicatively coupled with the media server and is adapted to provide control information to the media server for managing the conference call, wherein the application server is notified of the hot word and the speaker, and wherein the application server interrogates the database to determine if the speaker is authorized to invoke the conference feature.

BRIEF DESCRIPTION OF THE DRAWINGS

Aspects of the present disclosure are best understood from the following detailed description when read with the accompanying figures, in which.

DETAILED DESCRIPTION OF THE INVENTION

It is to be understood that the following disclosure provides many different embodiments or examples for implementing different features of various embodiments. Specific examples of components and arrangements are described below to simplify the present disclosure. These are, of course, merely examples and are not intended to be limiting.

In accordance with embodiments, automatic speech recognition functionality is deployed in a conferencing platform that facilitates verbal control of conference features. "Hot" or control words are configured in the conference platform that may be identified in speech supplied to the conference call.

Upon recognition of a hot word, a corresponding feature may be invoked. Advantageously, a mixed stream, e.g., output by a conference bridge or other entity, may be analyzed for recognition of hot words. Thus, a single stream may be analyzed for invoking conference features requested by any conference participant. In another embodiment, a speaker may be identified using speaker identification technologies. Identification of the speaker may be utilized to fulfill the speaker's request in response to recognition of a hot word and the speaker.

Figure 1:
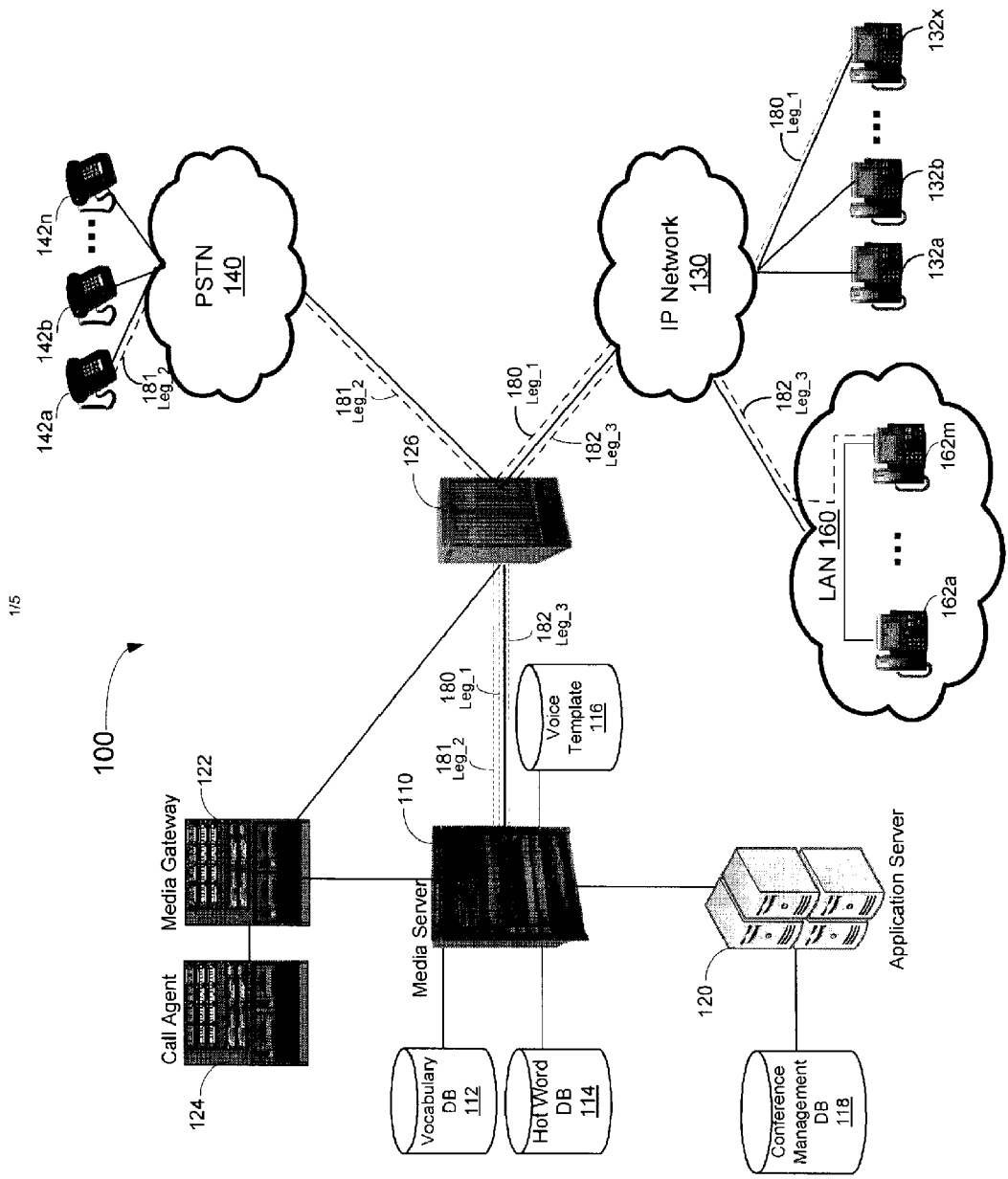
FIG. 1 is a diagrammatic representation of a network system featuring a conferencing system in which embodiments of the present invention may be implemented to facilitate verbal control of conferencing features.

FIG. 1 is a diagrammatic representation of a network system 100 featuring a teleconferencing system in which embodiments of the present invention may be implemented to facilitate verbal control of conferencing features. FIG. 1 is intended as an example, and not as an architectural limitation, of a network system in which embodiments described herein may be deployed, and embodiments disclosed herein may be implemented in any variety of network systems featuring a conferencing platform.

Network system 100 includes a media server 110 that may operate in conjunction with an application server 120. Media server 110 may process, manage, and provide appropriate resources to application server 120. Media server 110 may include call and media processing functionality, for example, speech and speaker recognition, audio bridging, voice and media processing and merging, and the like. Media server 110 may function as a call aggregation point through which call conferencing legs of various conference calls supported in system 100 are routed and processed. Additionally, media server 110 may optionally process audio content for voice over Internet Protocol (VoIP) transmission via an IP network 130. To this end, media server 110 may provide real time transport (RTP) of audio or video. Application server 120 may provide instructions to media server 110 on how to carry out specified services, such as audio conferencing instructions.

Media server 110 and application server 120 may interface with a media gateway 122 and call agent 124. Media server 110 may interface with an IP network 130 or the public switched telephone network 140, e.g., via a time division multiplexed (TDM) and packet switch 126 that may be deployed, for example, in a carrier network. Media gateway 122 may connect different media stream types to an end-to-end media path. Call agent 124 may provide various functions, such as billing, call routing, signaling, call services, and the like. Media gateway 122 and call agent 124 may interface with circuit and packet switch 126. Accordingly, media server 110 and application server 120 may function to provide call conferencing services to packet-switched telephony devices, such as IP telephones 162a-162m deployed in, for example, a local area network 160, IP devices 132a-132x connected with IP network 130 via, for example, digital subscriber line access modules at a carrier central office, and telephones 142a-142n interconnected with PSTN 140.

In accordance with an embodiment, media server 110 may feature speech recognition and speaker recognition modules. As is known, speech recognition comprises a process of converting a speech signal into a sequence of words by an algorithm implemented as a computer program. A speech recognition algorithm deployed at media server 110 may utilize a hidden Markov model, a dynamic programming approach, a neural network algorithm, a knowledge based learning approach, a combination thereof, or any other suitable speech recognition mechanism. A speaker recognition algorithm deployed at media server 110 recognizes a particular speaker from their voice. The speaker recognition algorithm may extract features from a speech signal, model the extracted features, and use them to recognize the speaker. The particular algorithms and underlying technologies of speech recognition and speaker recognition implemented in system 100 are immaterial with regard to the scope of the present invention, and any speech and speaker recognition mechanism may be deployed in system 100.

Media server 110 may include or interface with a vocabulary database 112 that comprises word representations and corresponding parameters thereof that facilitate matching a voice signal with a word. Media server 110 may additionally include or interface with a hot word database 114 that specifies words assigned to particular conference call features. Media server 110 may further include or interface with a voice template 116 that includes "voiceprints," e.g., spectrograms, obtained from users that may participate in a conference call. Voice template 116 is used to identify a particular speaker involved in a conference call. Alternatively, a voice model database may be substituted for voice template 116 for recognizing a particular speaker. Other technologies may similarly be substituted for voice template 116.

A prompt may be provided to each caller that has dialed into a conference call for the caller to state the caller's name. The caller's name may be used to populate voice template 116 for identifying the speaker of a hot word in accordance with an embodiment. In other implementations, other voice samples provided by call participants may be pre-loaded into voice template 116 prior to establishing a conference call. Furthermore, if voice template 116 includes samples of voice characteristics of all participants to be involved in a conference call prior to a caller attempting to join the conference call, voice template 116 may be used to potentially exclude callers from the conference call. For example, upon connection of a potential participant with media server 110, a prompt may be provided to the potential participant to submit a voice sample, e.g., a request from the caller to state the caller's name. A comparison may then be made with characteristics or models derived from the caller's spoken name with the voice samples maintained in voice template 116. In the event that the characteristics or models derived from the caller's spoken name do not match samples maintained in voice template 116, the caller may be prohibited from joining the conference call.

Application server 120 may include or interface with a conference management database 118 that maintains various information regarding conference calls. Conference management database 118 may maintain unique conference identifiers assigned to respective conference calls, unique call leg identifiers, information regarding conference call participants, and the like.

Each call leg may be terminated at a common network entity, such as media server 110. Each call leg is associated with a particular conference call, and legs of a common conference call are bridged. The bridged or mixed stream is then transmitted to each participant of the conference call. In accordance with an embodiment, the bridged stream is supplied to a speech recognition algorithm run by media server 110 and evaluated for any hot words included in the stream. On recognition of a hot word, a corresponding conference function assigned to the hot word may be invoked. In another embodiment, upon recognition of a hot word, a speaker recognition algorithm may be invoked, and an identity of the participant that spoke the hot word may be obtained. In this manner, conference features that may effect only one participant identified as the originator of the hot word may be invoked. For example, a participant may speak a hot word "mute", and upon recognition of the hot word and the speaker, any verbal input received on the recognized participant's call leg at media server 110 may be removed prior to bridging the conference legs thereby muting the identified participant. In accordance with another embodiment, some participants may be provided with conference privileges that other participants are not provided with. Accordingly, upon recognition of a hot word and speaker, media server 110 may provide a notification of the hot word and speaker to application server 120, and application server 120 may in turn evaluate conference management database 118 to determine if the speaker is authorized to invoke the conference function assigned to the hot word. In the event the speaker is authorized to invoke the conference feature, application server 120 may direct media server to invoke the conference feature. Alternatively, if the speaker is not authorized to invoke the conference feature, the hot word may be ignored.

In the present example, assume a three-way conference is set up for phones 132*x*, 142*a*, and 162*m*. Thus, each conference participant has a respective conference leg 180-182 (illustratively represented with dashed lines) established therefor. In the present example, media server 110 may provide conferencing functions, such as bridging, and thus legs 180-182 may terminate with media server 110. It is understood that each conference leg 180-182 may comprise two media streams—one outbound or egress stream from media server 110 to each participant device that comprises the bridged conference audio, and one inbound or ingress stream to media server 110 from the participant devices comprising the corresponding participant audio input supplied to media server 110 for bridging. The bridged egress streams to be transmitted from media server 110 are evaluated with a speech recognition algorithm and, optionally, a speaker recognition algorithm for identification of hot words for invoking conference features. Legs may be routed through other network devices, such as media gateway 122, for media translation, and the depicted example of conference legs 180-182 is simplified to facilitate an understanding of embodiments disclosed herein.

Figure 2:
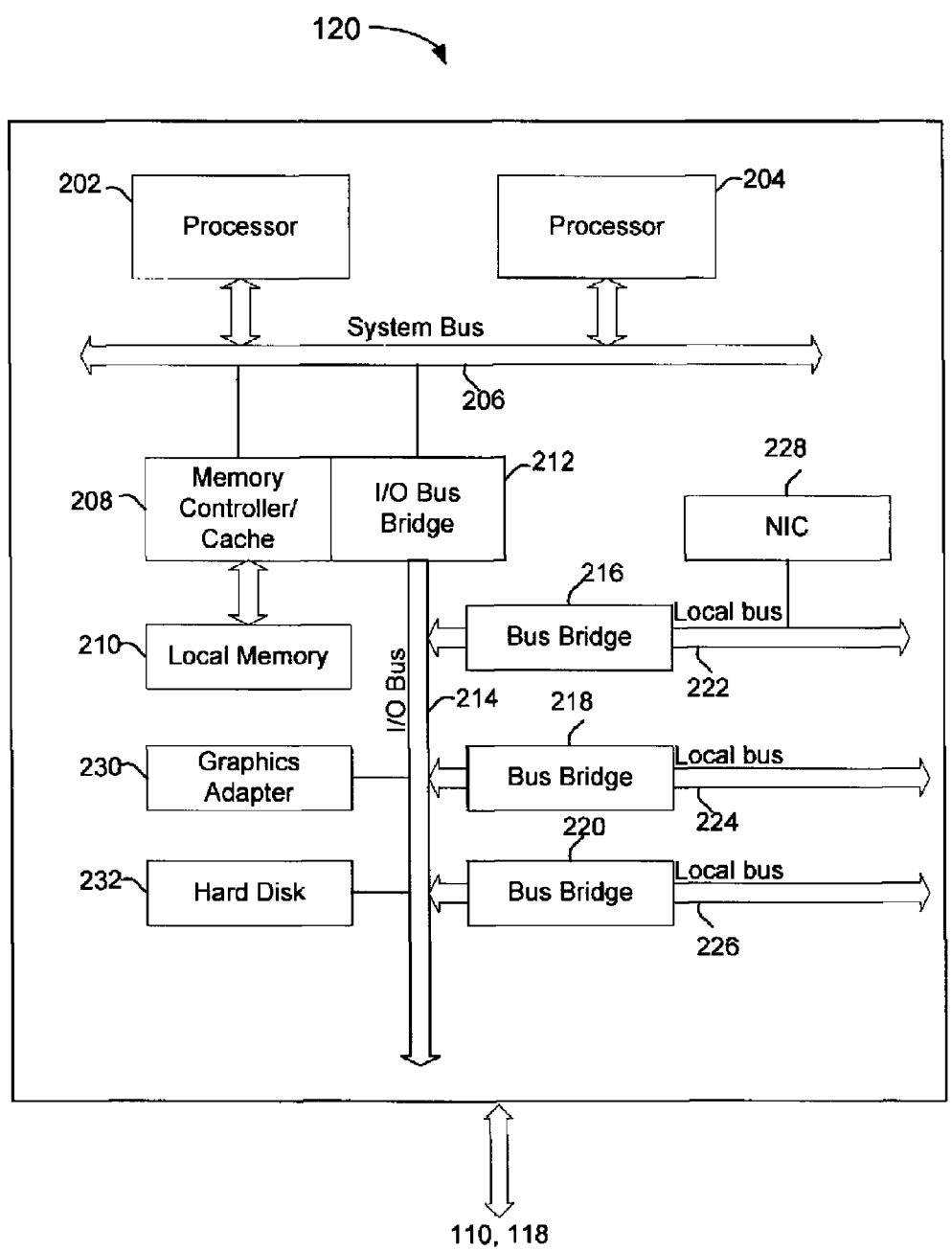
FIG. 2 is a diagrammatic representation of an exemplary embodiment of an application server depicted in FIG. 1.

FIG. 2 is a diagrammatic representation of an exemplary embodiment of an application server 120 depicted in FIG. 1. Code or instructions facilitating verbal control of conference features implemented in accordance with an embodiment of the present invention may be maintained or accessed by server 120.

Server 120 may be implemented as a symmetric multiprocessor (SMP) system that includes a plurality of processors 202 and 204 connected to a system bus 206, although other single-processor or multi-processor configurations may be suitably substituted therefor. A memory controller/cache 208 that provides an interface to local memory 210 may also be connected with system bus 206. An I/O bus bridge 212 may connect with system bus 206 and provide an interface to an I/O bus 214. Memory controller/cache 208 and I/O bus bridge 212 may be integrated into a common component.

A bus bridge 216, such as a Peripheral Component Interconnect (PCI) bus bridge, may connect with I/O bus 214 and provide an interface to a local bus 222, such as a PCI local bus. Communication links to other network nodes of system 100 in FIG. 1 may be provided through a network interface card (NIC) 228 connected to local bus 222 through add-in connectors. Additional bus bridges 218 and 220 may provide interfaces for additional local buses 224 and 226 from which peripheral or expansion devices may be supported. A graphics adapter 230 and hard disk 232 may also be connected to I/O bus 214 as depicted.

An operating system may run on processor system 202 or 204 and may be used to coordinate and provide control of various components within system 100. Instructions for the operating system and applications or programs are located on storage devices, such as hard disk drive 232, and may be loaded into memory 210 for execution by processor system 202 and 204.

Those of ordinary skill in the art will appreciate that the hardware depicted in FIG. 2 may vary. The depicted example is not intended to imply architectural limitations with respect to implementations of the present disclosure, but rather embodiments disclosed herein may be run by any suitable data processing system.

Figures 3, 4:
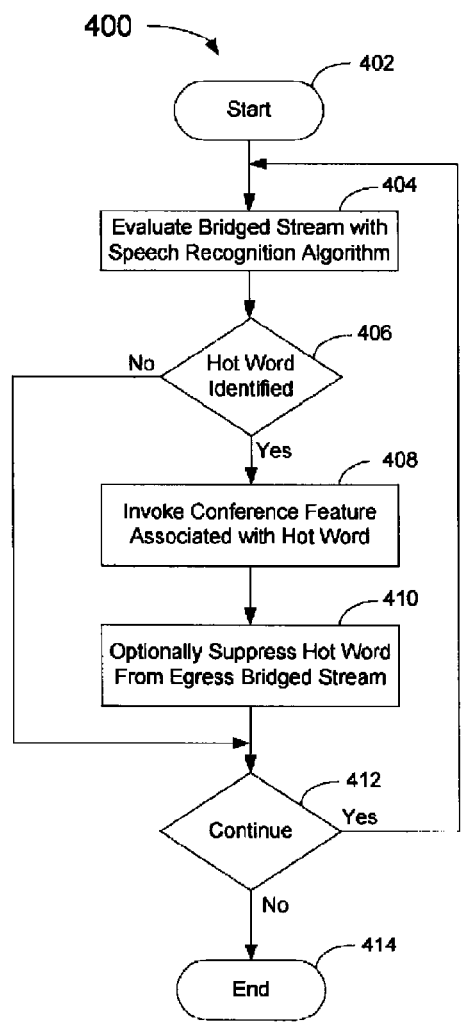
FIG. 3 is a diagrammatic representation of a conference management table that may be maintained by an application server that facilitates verbal control of conferencing services in accordance with an embodiment of the invention.
FIG. 4 is a flowchart depicting processing of a verbal conference control routine implemented in accordance with an embodiment of the invention.

FIG. 3 is a diagrammatic representation of a conference management table 300 that may be maintained by application server 120 that facilitates verbal control of conferencing services in accordance with an embodiment of the invention. Table 300 comprises a plurality of records 310*a*-310*c* (collectively referred to as records 310) and fields 320*a*-320*n* (collectively referred to as fields 320). Table 300 may be stored on a disk drive, fetched therefrom by a processor of application server 120, and processed thereby.

Each record 310*a*-310*c*, or row, comprises data elements in respective fields 320*a*-320*n*. Fields 320*a*-320*n* have a respective label, or identifier, that facilitates insertion, deletion, querying, or other data operations or manipulations of table 300. In the illustrative example, fields 320*a*-320*n* have respective labels of "Conference ID", "User ID", "Call Leg ID", "Lock", "Mute", and "Roll Call".

In the present example, assume records 310*a*-310*c* are allocated for the conference call depicted in FIG. 1 that comprises three conference participants. Conference ID field 320*a* stores data elements that specify a unique ID (illustratively designated "Conference_A") assigned to the conference call. A conference ID may, for example, comprise a numerical tag assigned to a conference. User ID field 320*b* stores data elements, such as a user name, a telephone number, an IP address, or another unique identifier associated with a conference participant or participant telephony device. Call leg ID field 320*c* stores data elements that specify an identifier of a particular call leg in respective records 310*a*-310*c*. In the present example, call leg ID field 320*c* specifies that call legs 180-182 (illustratively designated "Leg_1"-"Leg_3") are each allocated for the conference specified in field 320*a* of respective records 310*a*-310*c*.

Lock field 320*d*, mute field 320*e*, and roll call field 320*n* are examples of conference feature control fields that may optionally be included in management table 300 in accordance with an embodiment. Fields 320*d*-320*n* specify whether a particular conference participant in a corresponding record 310 has a privilege for invoking a particular conference service. For example, lock field 320*d* specifies whether the users specified in user ID field 320*b* are able to invoke a lock feature in the conference that prohibits other participants from joining the conference. In the present example, lock field 320*d* has a value of true ("T") in record 310*a* thereby indicating that User_A may invoke a lock feature of the conference, while lock field 320*d* has a value of false ("F") in records 310*b*-310*c* thereby indicating that neither User_B or User_C may invoke a lock feature. In this manner, one or more participants, such as a conference manager or planner, may be allocated privileges that other conference participants aren't allocated. In the present example, each of the users User_A-User_C are allocated mute and roll call privileges as indicated by fields 320*e* and 320*n*. Privileges for any number of other conference features may likewise be allocated in table 300 in addition to, or in lieu of, those depicted, and the exemplary conference feature allocations provided by fields 320*d*-320*n* are illustrative only. Other conference information may be included in table 300, such as source and destination addresses and ports of conference legs, or other suitable information that facilitates management of a conference call.

FIG. 4 is a flowchart 400 depicting processing of a verbal conference control routine implemented in accordance with an embodiment of the invention. The processing steps of FIG. 4 may be implemented as computer-executable instructions executable by a processing system, such as media server 110 and/or application server 120.

The routine is invoked (step 402), and the bridged stream of a conference call is evaluated by a speech recognition algorithm (step 404). An evaluation may be made to determine if any hot words are identified in the bridged stream (step 406). In the event that a hot word is not identified in the evaluated portion of the bridged stream, the control routine may proceed to evaluate whether evaluation of the bridged stream is to continue (step 412).

Returning again to step 406, in the event that a hot word is identified in the evaluated portion of the bridged stream, the conference feature associated with the hot word may be invoked (step 408). The portion of the bridged stream in which the hot word is identified may then optionally be removed or otherwise suppressed from the bridged stream prior to transmission of the bridged stream from the media server to the conference participants (step 410). Advantageously, conference participants would not receive the audio comprising verbalization of the hot word in the conference call stream received at the participant conference devices. The control routine may then proceed to evaluate whether evaluation of the bridged stream is to continue according to step 412. In the event that evaluation of the bridged stream is not to continue, the control routine cycle may terminate (step 414).

Figure 5:
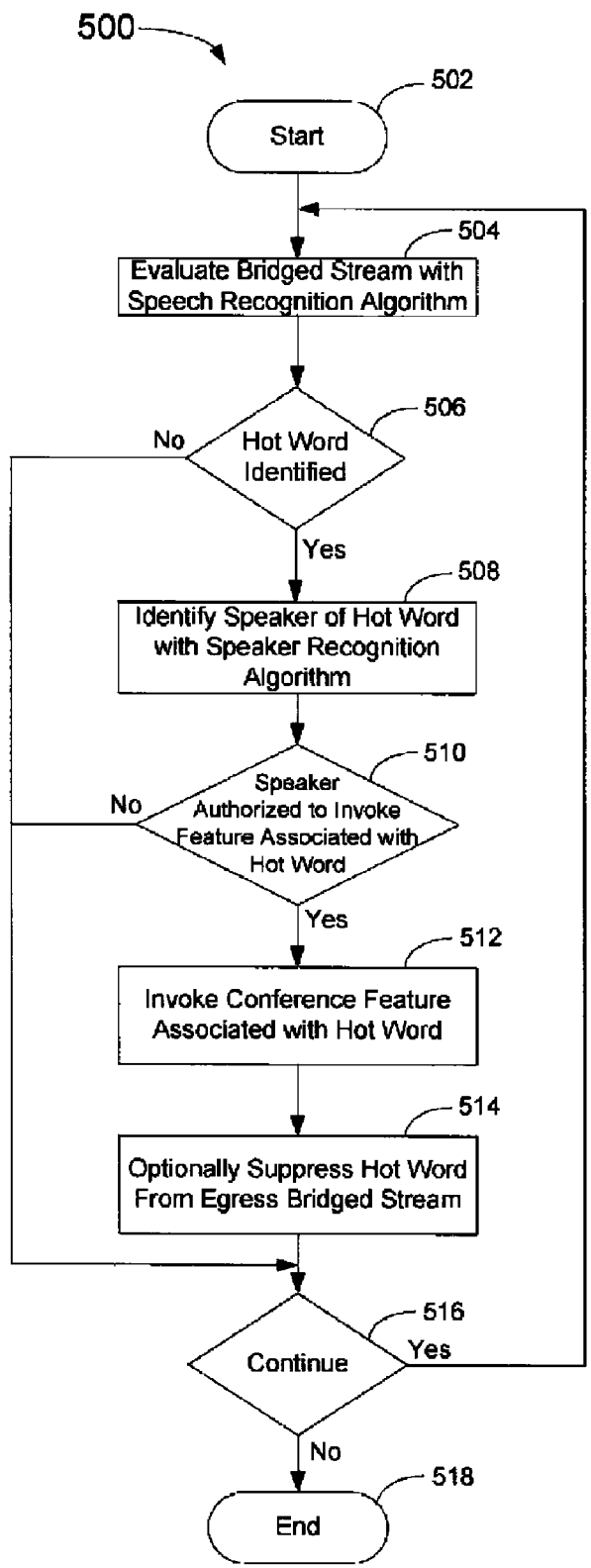
FIG. 5 is a flowchart depicting processing of an alternative embodiment of a verbal conference control routine.

FIG. 5 is a flowchart 500 depicting processing of an alternative embodiment of a verbal conference control routine. The processing steps of FIG. 5 may be implemented as computer-executable instructions executable by a processing system, such as media server 110 and/or application server 120.

The routine is invoked (step 502), and the bridged stream of a conference call is evaluated by a speech recognition algorithm (step 504). An evaluation may be made to determine if any hot words are identified in the bridged stream (step 506). In the event that a hot word is not identified in the evaluated portion of the bridged stream, the control routine may proceed to determine whether evaluation of the bridged stream is to continue (step 516).

Returning again to step 506, in the event that a hot word is identified in the evaluated portion of the bridged stream, the speaker of the hot word may be identified by a speaker recognition algorithm (step 508). For example, metrics or characteristics of the identified hot word may be compared with records in voice template 116 associated with each participant in the conference call. As noted above, the samples or voice characteristics in voice template 116 may comprise samples that were loaded into voice template 116 prior to establishing the conference call. In another embodiment, the samples of voice template 116 for identifying a speaker may comprise each participant's spoken name as provided by respective participants upon joining the conference call. Upon identification of the speaker of the hot word, an evaluation may be made to determine if the speaker is authorized to invoke the conference feature associated with the hot word (step 510). For example, media server 110 may notify application server 120 of the hot word and the identified speaker. Application server 120 may then retrieve the record in management database 118 allocated for the identified speaker, and may evaluate the privilege field of the identified spoken hot word to determine if the speaker is authorized to invoke the conference feature. In the event that the identified speaker is not authorized to invoke the conference feature, the control routine may proceed to determine whether evaluation of the bridged stream is to continue according to step 516. If it is determined that the identified speaker is authorized to invoke the conference feature associated with the hot word, the conference feature associated with the hot word may be invoked (step 512). The portion of the bridged stream in which the hot word is identified may then optionally be removed or otherwise suppressed from the bridged stream prior to transmission of the bridged stream from the media server to the conference participants (step 514). The control routine may then proceed to determine whether evaluation of the bridged stream is to continue according to step 516. In the event that evaluation of the bridged stream is not to continue, the control routine cycle may terminate (step 518).

In accordance with another embodiment, a participant, upon calling into a conference, may be requested to state the participant's name prior to bridging the participant into the conference call, e.g., by transmission of an audible request for the caller to state the caller's name. On receipt of a response from the participant, media server 110 may record, e.g., in voice template 116, the participant's audible response, or metrics, characteristics, or speech models derived therefrom. The participant's name, as spoken by the participant, may be maintained in voice template 116 for the duration of the conference call. The participant's name (or characteristics thereof) as spoken by the participant may be used for speaker identification. In this manner, characteristics of the speaker's name may be used for identifying a speaker of a hot word by comparing characteristics of a detected hot word with spoken names of conference participants.

In accordance with another embodiment, speech and speaker recognition may be utilized to invoke a conference feature spoken by a first participant that provides a feature related to another participant. For example, a conference manager or other participant authorized to invoke conference features on behalf of other participants may state a hot word followed by a particular participant's name. The speaker of the hot word may be identified along with the hot word. An evaluation may then be made to determine if a participant's name was spoken subsequent to the hot word. If so, a conference function associated with the hot word may be invoked on behalf of the participant's name that followed the spoken hot word.

Figure 6:
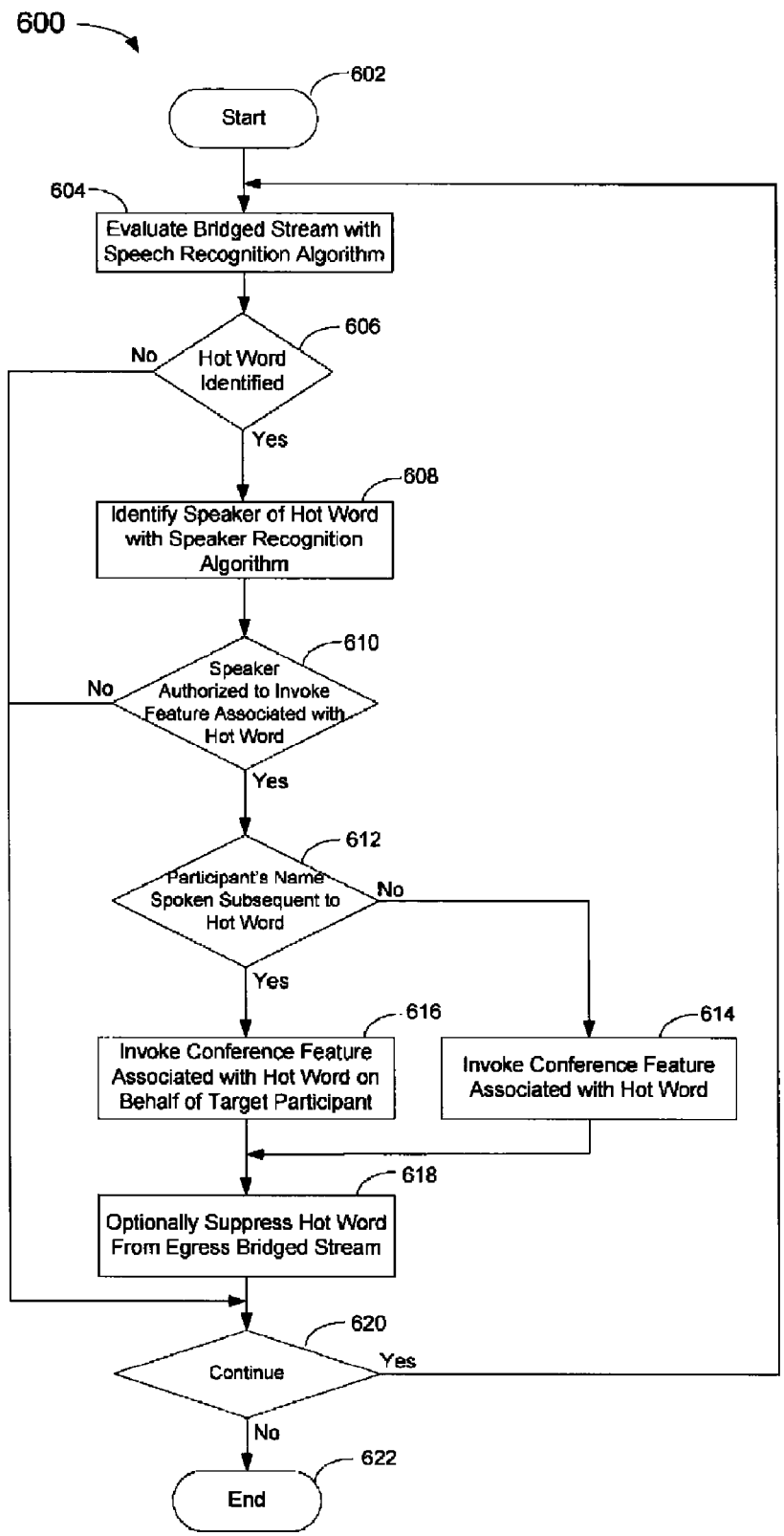
FIG. 6 is a flowchart depicting processing of a verbal conference control routine that allows a conference participant to invoke a conference feature on behalf of another participant in accordance with an embodiment of the invention.

FIG. 6 is a flowchart 600 depicting processing of a verbal conference control routine that allows a conference participant to invoke a conference feature on behalf of another participant in accordance with an embodiment of the invention. The processing steps of FIG. 6 may be implemented as computer-executable instructions executable by a processing system, such as media server 110 and/or application server 120. In the flowchart of FIG. 6, it is assumed that each participant has provided a voice input of the participant's name when joining the conference. Each participant's name may be maintained by, for example, media server 110 in voice template 116.

The routine is invoked (step 602), and the bridged stream of a conference call is evaluated by a speech recognition algorithm (step 604). An evaluation may be made to determine if any hot words are identified in the bridged stream (step 606). In the event that a hot word is not identified in the evaluated portion of the bridged stream, the control routine may proceed to determine whether evaluation of the bridged stream is to continue (step 620).

Returning again to step 606, in the event that a hot word is identified in the evaluated portion of the bridged stream, the speaker of the hot word may be identified by a speaker recognition algorithm (step 608). For example, metrics or characteristics of the identified hot word may be compared with records in voice template 116 associated with each participant in the conference call. Upon identification of the speaker of the hot word, an evaluation may be made to determine if the speaker is authorized to invoke the conference feature associated with the hot word (step 610). For example, media server 110 may notify application server 120 of the hot word and the identified speaker. Application server 120 may then retrieve the record in management database 118 allocated for the identified speaker, and may evaluate the privilege field of the identified spoken hot word to determine if the speaker is authorized to invoke the conference feature. In the event that the identified speaker is not authorized to invoke the conference feature, the control routine may proceed to determine whether evaluation of the bridged stream is to continue according to step 620. If it is determined that the identified speaker is authorized to invoke the conference feature associated with the hot word, an evaluation may be made to determine if another participant's name was spoken subsequent to the identified hot word (step 612). For example, a pre-defined interval, such as 1 second, of the bridged media stream subsequent to the identified hot word may be evaluated for a participant's name spoken by the speaker of the hot word. In the event that a participant's name is not identified subsequent to the hot word, the conference feature associated with the hot word may be invoked (step 614). The portion of the bridged stream in which the hot word is identified may then optionally be removed or otherwise suppressed from the bridged stream prior to transmission of the bridged stream from the media server to the conference participants (step 618).

Returning again to step 612, in the event that a participant's name is identified subsequent to the hot word, the conference feature associated with the hot word may be invoked on behalf of the target participant, i.e., the participant whose name was identified as spoken subsequent to the hot word (step 616). The control routine may then proceed to optionally suppress the hot word (and the target participant's name in the event the conference feature has been invoked by the hot word speaker on behalf of another participant) according to step 618. The control routine may then proceed to determine whether evaluation of the bridged stream is to continue according to step 620. In the event that evaluation of the bridged stream is not to continue, the control routine cycle may terminate (step 622).

In this manner, a conference feature may be invoked by one participant on behalf of another participant. For example, a conference manager or coordinator may wish to mute a particular participant. Accordingly, the manager may speak the hot word "mute" followed by the participant's name. The media stream received at media server 110 from the target participant may then be excluded from bridging into the conference call thereby muting the target participant. To this end, table 300 may additionally specify whether a participant has a privilege for invoking a conference feature on behalf of another conference participant. Moreover, some conference features may not be able to be invoked by one participant on behalf of another. Accordingly, the conference control routine of FIG. 6 may evaluate whether a hot word identified at step 610 is able to be invoked by one participant on behalf of another participant. In the event that the hot word is not able to be invoked on behalf of another participant, the control routine may proceed to invoke the conference feature according to step 614 thereby bypassing steps 612 and 616.

As described, mechanisms for providing verbal control of conference call features are provided. Automatic speech recognition functionality is deployed in a conferencing platform. Hot words are configured in the conference platform that may be identified in speech supplied to a conference call. Upon recognition of a hot word, a corresponding feature may be invoked. Advantageously, a mixed stream, e.g., output by a conference bridge or other entity, may be analyzed for recognition of hot words. Thus, a single stream may be analyzed for invoking conference features requested by any conference participant. In another embodiment, a speaker may be identified using speaker identification technologies. Identification of the speaker may be utilized to fulfill the speaker's request in response to recognition of a hot word and the speaker. Moreover, particular participants may be provided with conference control privileges that are not provided to other participants. Upon recognition of a hot word, the speaker may be identified to determine if the speaker is authorized to invoke the conference feature associated with the hot word.

The flowcharts of FIGS. 4-6 depict process serialization to facilitate an understanding of disclosed embodiments and are not necessarily indicative of the serialization of the operations being performed. In various embodiments, the processing steps described in FIGS. 4-6 may be performed in varying order, and one or more depicted steps may be performed in parallel with other steps. Additionally, execution of some processing steps of FIGS. 4-6 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single processor or multiple processors. Additionally, various steps of embodiments of the invention may provide one or more data structures generated, produced, received, or otherwise implemented on a computer-readable medium, such as a memory.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for providing verbal control of a conference call in a conferencing system, comprising:
    bridging a plurality of conference call legs to form a bridged conference stream in the conferencing system;
    evaluating the bridged conference stream with a speech recognition algorithm;
    determining if a first hot word is identified in the bridged conference stream, wherein at least a caller name is used to populate a voice template for identifying the first hot word;
    responsive to determining the first hot word is in the bridged conference stream, invoking a conference feature associated with the first hot word; and
    suppressing the first hot word in the bridged stream prior to transmission of the bridged stream to conference participants.

2. The method of claim 1, further comprising:
    determining a second hot word is identified in the bridged conference stream; and
    invoking a speaker recognition algorithm to identify the speaker of the second hot word.

3. The method of claim 2, further comprising determining if the speaker is authorized to invoke a conference feature associated with the second hot word.

4. The method of claim 3, further comprising invoking the conference feature associated with the second hot word in response to determining the speaker is authorized.

5. The method of claim 3, wherein determining if the speaker is authorized further comprises evaluating a record assigned to the speaker that specifies privileges allocated to the speaker.

6. The method of claim 1, wherein determining if a first hot word is identified in the bridged conference stream comprises comparing a word identified in the bridged conference stream with a database of hot words configured for the conferencing system.

7. A computer-readable medium having computer-executable instructions for execution by a processing system, the computer-executable instructions for providing verbal control of a conference call in a conferencing system, the computer-readable medium comprising instructions for:
    bridging a plurality of conference call legs to form a bridged conference stream;
    evaluating the bridged conference stream with a speech recognition algorithm;
    determining if a hot word is identified in the bridged conference stream, wherein at least a caller name is used to populate a voice template for identifying the first hot word;
    responsive to determining the hot word is in the bridged conference stream, identifying a speaker of the hot word; and
    suppressing the hot word in the bridged stream prior to transmission of the bridged stream to conference participants.

8. The computer-readable medium of claim 7, further comprising instructions for determining whether the speaker is authorized to invoke a conference feature associated with the hot word.

9. The computer-readable medium of claim 8, further comprising instructions for invoking the conference feature in response to determining the speaker is authorized to invoke the conference feature.

10. The computer-readable medium of claim 8, wherein the conference feature is not invoked in response to determining the speaker is not authorized to invoke the conference feature.

11. The computer-readable medium of claim 7, further comprising instructions that define conference privileges of each participant of the conference call.

12. The computer-readable medium of claim 7, further comprising instructions for:
    determining if a participant's name was spoken in a predefined interval subsequent to the hot word; and
    invoking a conference feature associated with the hot word on behalf of a participant having the participant's name.

13. The computer-readable medium of claim 7, wherein the instructions for determining if a hot word is identified in the bridged conference stream comprises instructions for comparing a word identified in the bridged conference stream with a database of hot words configured for the conferencing system.

14. A system for providing a conference call, comprising:
    a database that specifies privileges of respective conference participants;
    a media server adapted to terminate a conference leg with each of a plurality of terminal devices of the participants, bridge a plurality of conference legs to form a bridged conference stream, evaluate the bridged conference stream with a speech recognition algorithm, determine a hot word is included in the bridged conference stream, and identify a speaker of the hot word, wherein the hot word is associated with a conference feature, wherein the media server suppresses the hot word in the bridged conference stream prior to transmission of the bridged conference stream to the conference participants, wherein at least a caller name is used to populate a voice template for identifying the first hot word; and
    an application server communicatively coupled with the media server and adapted to provide control information to the media server for managing the conference call, wherein the application server is notified of the hot word and the speaker, and wherein the application server interrogates the database to determine if the speaker is authorized to invoke the conference feature.

15. The system of claim 14, wherein the application server determines the speaker is authorized to invoke the conference feature.

16. The system of claim 15, wherein the application server directs the media server to invoke the conference feature.

17. The system of claim 14, further comprising a database of hot words that is communicatively coupled with the media server, wherein the media server determines the hot word is included in the bridged conference stream by obtaining a match with the hot word and an entry in the database of hot words.

* * * * *